UNITED STATES PATENT OFFICE.

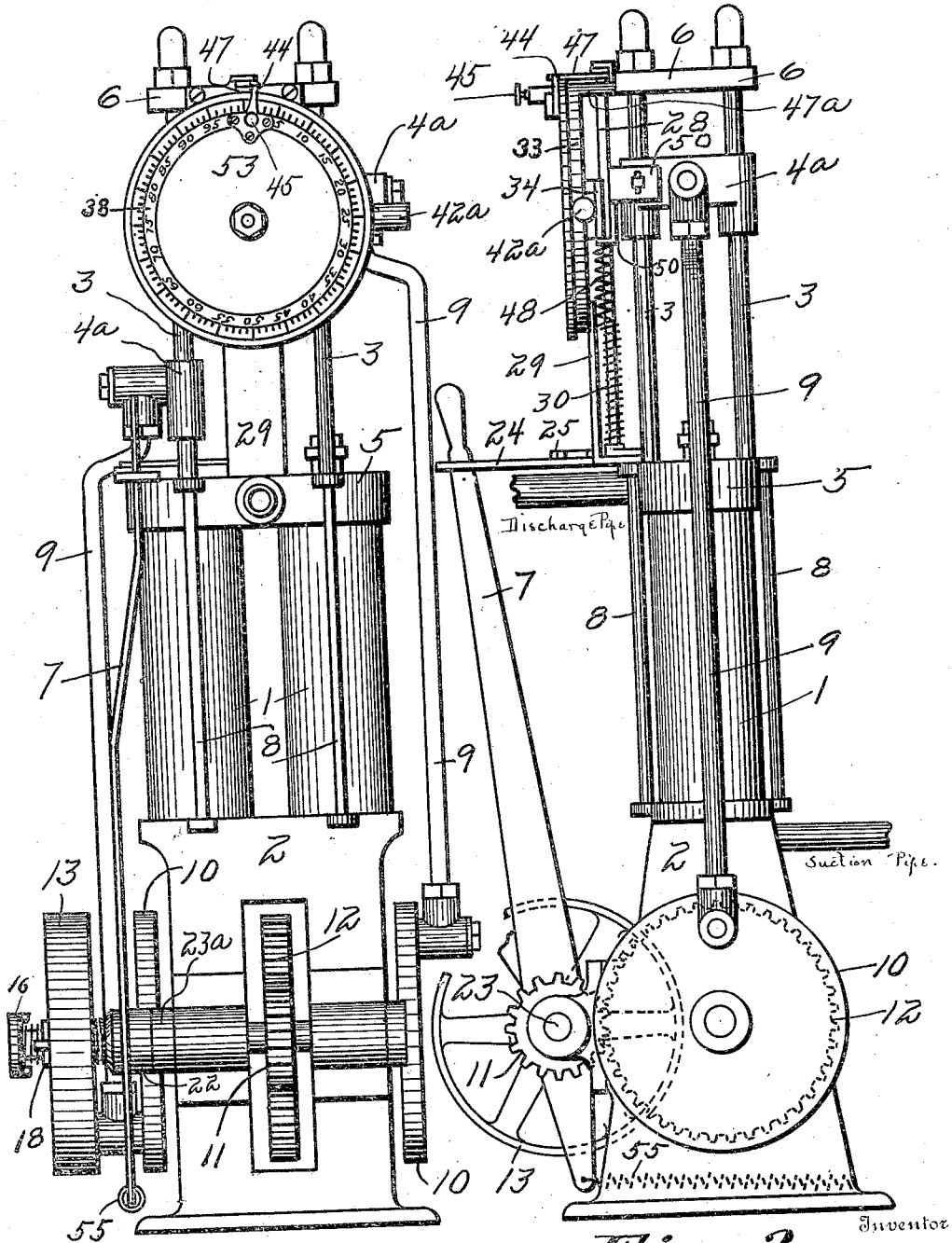

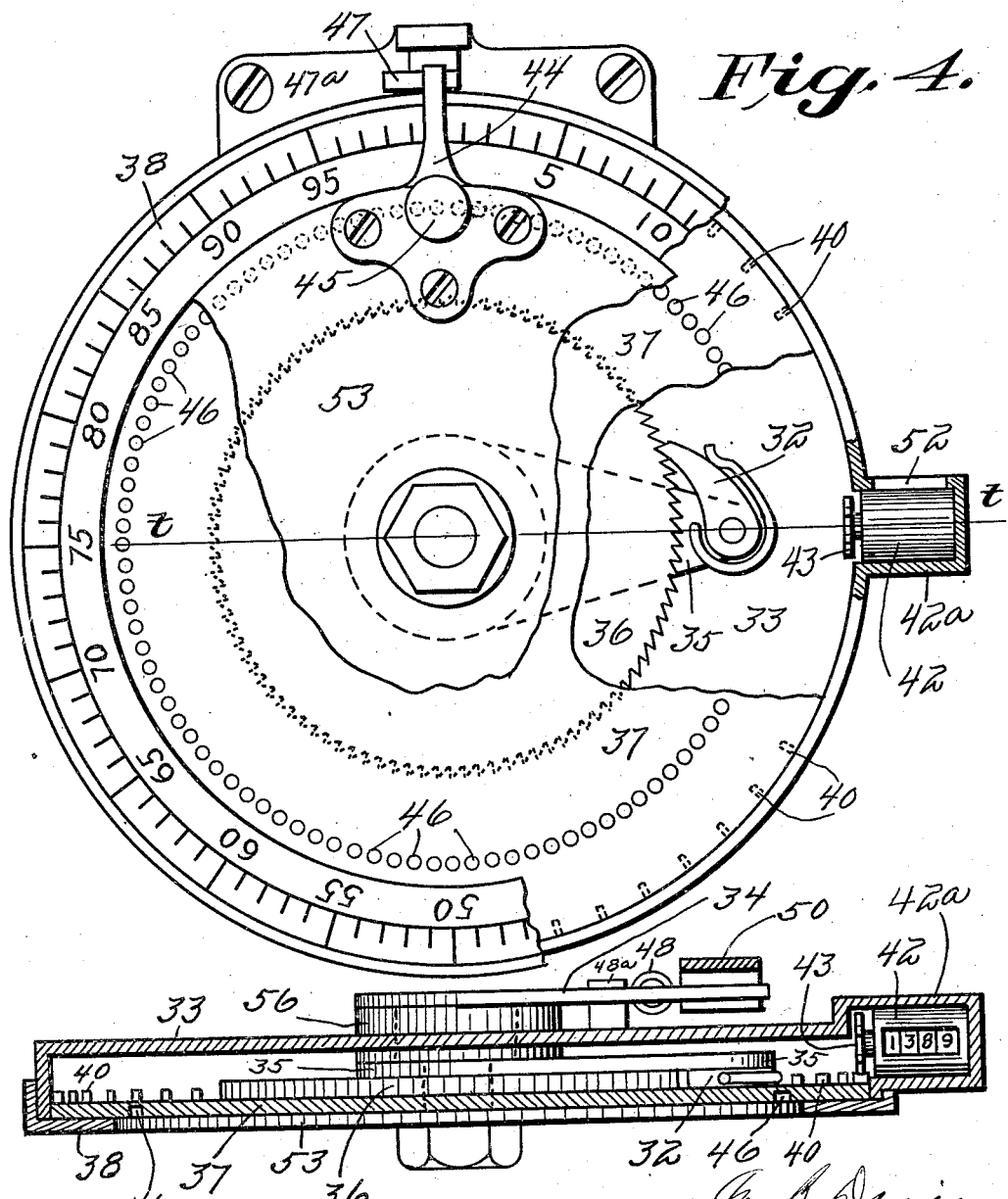

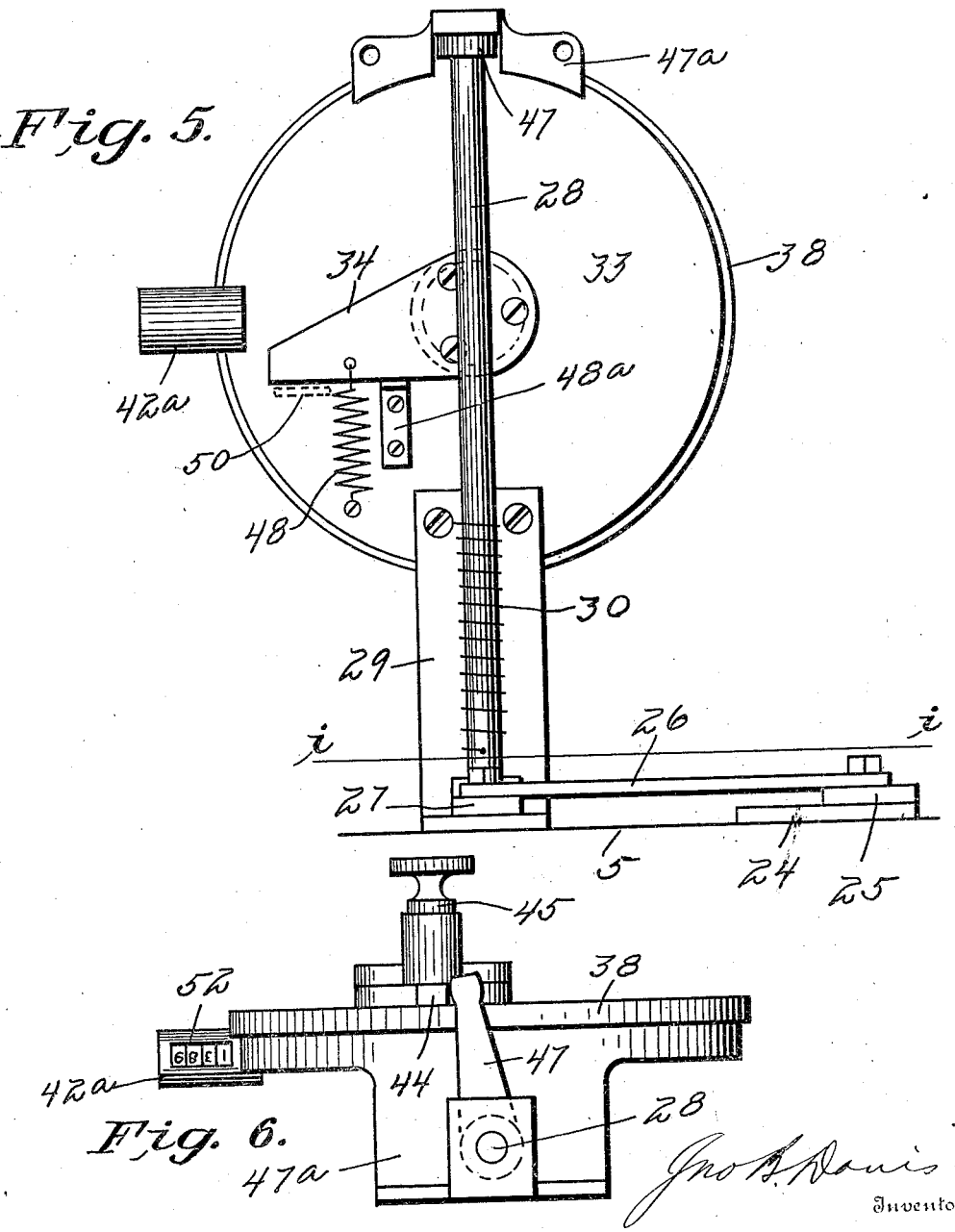

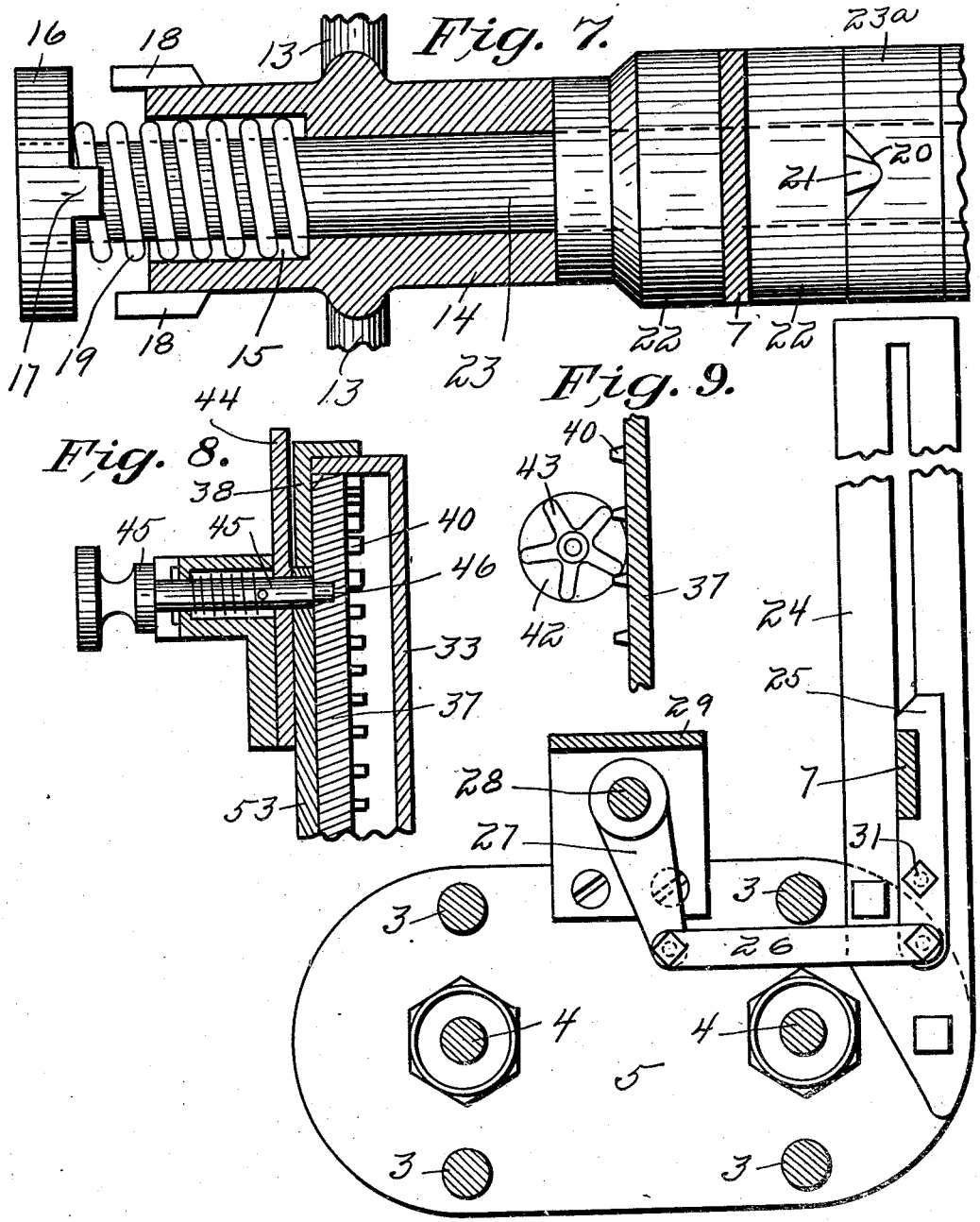

JOHN B. DAVIS, OF DAYTON, OHIO, ASSIGNOR TO THE NATIONAL OIL PUMP & TANK CO., OF DAYTON, OHIO, A CORPORATION OF OHIO.

POWER-PUMP FOR MEASURING OIL.

No. 874,573.   Specification of Letters Patent.   Patented Dec. 24, 1907.

Application filed February 6, 1907. Serial No. 355,989.

*To all whom it may concern:*

Be it known that I, JOHN B. DAVIS, a citizen of the United States, residing at Dayton, in the county of Montgomery and State of Ohio, have invented certain new and useful Improvements in Power-Pumps for Measuring Oil; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in self-measuring oil pumps.

The object of the invention is to provide an oil pump which is adapted to be operated by power.

Among the principal advantages of a pump of this character is its several automatic features, among which may be mentioned means for setting the pump to discharge a certain specific quantity of oil and at the termination of the operation, it is stopped and the power automatically disconnected.

Other advantages of no less importance are present, as will hereinafter appear from the detailed description of the invention to follow, taken in connection with the accompanying drawings, and as set forth in the claims.

In the drawings, Figure 1, is a front elevation of a power pump for measuring oil, the same being constructed in accordance with my invention. Fig. 2, is a side elevation of Fig. 1. Fig. 3, is a section on the line $t$—$t$ of Fig. 4. Fig. 4, is an enlarged detached view of the computing dial and adjunctive devices, parts being broken away. Fig. 5, is an enlarged detached view of the tripping mechanism through which the power is cut off from the pump automatically, at each complete operation. Fig. 6, is a detached view of the computing dial and adjunctive devices looking on the edge thereof. Fig. 7, is an enlarged sectional view of the main power shaft and in which the clutch mechanism is illustrated. Fig. 8, is a sectional view through the dial indexing mechanism. Fig. 9, is a detailed view of the consecutive counter operating in connection with the indicator dial. Fig. 10, is an enlarged detail view of a portion of the mechanism for automatically releasing the manually-operative lever, on the line $i$—$i$ of Fig. 5.

In a detailed description of the invention, similar reference characters indicate corresponding parts.

The two cylinders 1 are mounted upon a base 2 and are inclosed at their upper ends by a cap 5 in which there is an opening for the outlet pipe; the cylinders so mounted are maintained between the base 2 and the cap 5 by tie rods 8. The rods 4 (Fig. 10) extending from the pistons within said cylinders are each connected to a cross head $4^a$ which moves on guide rods 3 secured between the cap 5 and head 6. Connected to each of the cross heads $4^a$ is a pitman 9 lying upon the outside of the pump cylinders and connected at their lower ends with a crank wheel 10. Upon the shaft of these crank wheels there is a gear wheel 12 which engages a pinion 11 on the main power shaft 23 which is driven through the main driving pulley 13 through the clutch mechanism illustrated in Figs. 2 and 7. The main driving pulley 13 runs loosely upon the shaft 23 and has clutch members 18 projected from the outer side or end of its hub 14, said outer end of said hub being provided with a recess 15 to receive a spring 19. On the outer end of the shaft 23 there is a clutch 16 which is normally maintained out of an interlocking position with the hub 14 owing to the tension of the spring 19 being sufficient to maintain said hub in its inner position upon said shaft 23. The clutch 16 is tight upon the end of the shaft 23 and has interlocking lugs 17 which engage the clutch members 18 when the hub 14 is shifted into position, against the tension of the spring 19, to admit of such engagement. Mounted loosely upon the shaft 23 adjacent to the hub 14 is a journal boss 22 of the lever 7. Projecting from the side of said boss 22 is a cam 21 which is designed to ride into and out of a recess 20 in a collar $23^a$ which is fixed to a stationary part, for example, the bearing of the shaft 23. When the operating lever 7 is moved inwardly from the position shown in Fig. 2, to that shown in Fig. 10, the cam projection 21 on the boss of said lever is caused to move out of the recess 20 and thus forces the driving pulley 13 in engagement with the clutch 16, the latter, as before stated, being tight upon the shaft of said pulley; the power is thus transmitted to the crank wheel 10 and thence to the pistons within the cylinders to move said pistons in opposite directions within the cylinders. The lever 7 moves in a slot in a guide plate 24 attached to the cap 5 at the upper ends of said cylinders and a latch 25 is pivoted at 31 to the upper side of said plate 24 and lies substantially parallel with the slot in which the lever is moved; when the lever is moved against the latch 25 it is thrown outwardly and the lever is thus enabled to interlock with the latch as shown in Fig. 10. The latch 25 is connected to an upright rod 28 through the means of a link 26 and a crank arm 27, the crank arm being fixed to the lower end of the shaft 28. Surrounding a portion of the shaft 28 is a coil spring 30 which exerts a tension upon the shaft which normally maintains the latch 25 in the position shown in Fig. 10. In operating the lever to move it inwardly, the said lever moves the latch outwardly against this spring tension, after which the spring exerts its influence upon the shaft 28 to return the latch to its normal position as in Fig. 10; this latch is automatically tripped from the position shown in Fig. 10, to permit of the withdrawal of the lever 7 to disengage the clutches at the termination of each operation of the pump; the means for thus automatically tripping said lever will be presently described.

The indicating dial shown in Figs. 4 and 5, more clearly, comprises several parts which are housed within a stationary circular plate 33 having an out-turned annular edge; this plate is mounted above the cylinders on a lower bracket 29 which is secured to the cap 5, and an upper bracket 47ª which is secured to the head 6. 38 is a stationary ring attached to the plate 33 and having graduations on its outer side which designate gallons, there being one hundred of such graduation marks, each of which indicates a gallon of oil. Within the housing thus formed by the stationary plate 33 and dial ring 38, is a ratchet wheel 36 having teeth corresponding in number to the graduation marks on the dial ring 38; this ratchet wheel is fixed to a disk 37 which has in its inner side a concentric line of apertures 46 which correspond in number to the graduation marks on the ring 38, and the teeth on the wheel 36; these parts, to-wit—the ratchet wheel 36 and the disk 37 rotate in unison upon a common shaft which penetrates the axis of the plate 33 and has a proper bearing therein. On the inner side of the disk 37 there is a concentric row of pins 40, the number of such pins being half that of the number of the graduations on the dial ring 38; further reference will be made to these pins 40. The pointer 44 is mounted upon a disk 53 which lies flush with the dial ring 38, said disk being loose upon a stub shaft. Penetrating the disk 53 in alinement with the pointer 44, is a spring-controlled pin 45 which is adapted to be inserted in any one of the apertures 46 by rotating the dial 53 with the pointer, the pointer being movable from the zero position shown in Fig. 4 to the desired aperture 46 and the pin 45 caused to enter said aperture after which the pointer is caused to return to the zero position step by step until it reaches such position at which time it trips the arm 47 on the upper end of the rod 28 and removes the latch 25 from engagement with the operating lever 7 and permits the spring 55 in the base of the pump to throw out the operating lever 7 and release the clutch devices to shut off the power. See Figs. 2—7 and 10. It will be understood that the disk 53 with the dial pointer 44 is moved to the right as shown in Fig. 4 to index the pointer 44 at the proper point on the dial ring 38, and that owing to the engagement of said disk 53 with the disk 36 through the pin 45 in aperture 46, the said disk 53 with the pointer is given a reverse movement or a movement to the left from the index position, see Fig. 4.

The ratchet wheel 36 is moved step by step from either of the piston rods through the following intervening mechanism: 32 is a ratchet pawl engaging the teeth of the ratchet wheel 36; this pawl 32 is carried upon an arm 35 lying within the housing formed of the plates 33 and 38. This arm 35 is connected with a similar arm 34 through an intervening hub shown in dotted lines in Fig. 3, said hub having a bearing in a boss 56 extending on each side of the stationary plate 33. The outer arm 34 lies in the path of a trip arm 50 which is attached to one of the cross heads only—see Fig. 2, and when the cross head 4 is elevated by its specific piston rod, the trip arm 50 engages the arm 34 and imparts movement to the pawl-carrying arm 35 sufficient to cause a movement of the ratchet wheel 36 to the extent of one tooth or to the extent of a gallon of oil. At this point it will be understood that each of the cylinders 1 has a capacity for pumping a half gallon of oil in each operation and that a discharge of each cylinder is necessary to dispense a gallon of oil; it therefore will be seen that the operation of one cylinder alone need be recorded on the dial and that such operation has the effect of moving the ratchet wheel 36 and therewith the disk 37 the extent of one tooth or one gallon of oil, the combined quantity dispensed in a single operation of each cylinder. The disk 37 has a series of pins 40 on its inner side before referred to; these pins in the rotation of the disk 37 in the manner just described, will engage a toothed wheel 43 on the shaft of a consecutive counter 42 housed within an off-set 42ª on a side of the stationary plate 33, said off-set having a sight opening 52 through which the consecutive counter 42 is visible. As before stated, each of the pins 40 stand for two gallons of oil, while each of the teeth on the ratchet wheel 36, and the apertures 46 in the disk 37 stand for one gallon of oil, therefore when each of the pins 40 trip the toothed wheel 43, two gallons of oil is added upon the counter 42.

The arm 34, when released by the trip arm 50 is controlled by a spring 48 which maintains said arm in its operative position by stopping it against a stop-piece 48ª attached to the stationary plate 33.

Having described my invention, I will detail briefly an operation thereof.

Looking at Fig. 4, to dispense a quantity of oil, say ten gallons, the pin 45 Figs. 4 and 8, is withdrawn from its zero engagement with the disk 37 and is moved with the pointer to a position which admits of said pin reëntering the aperture 46 in the disk 37, in a line with Fig. 10 on the dial ring 38. The dial pointer is then indexed for its backward movement to zero. The lever 7 is then moved inwardly from the position shown in Fig. 2 to that shown in Fig. 10, and is locked in such position by the latch 25; by this operation, the main driving wheel 13 is caused to engage the clutch, Fig. 7, and the machine is started. One or the other of the pump cylinders is caused to first discharge its half gallon of oil, after which the next pump cylinder is caused to make a similar discharge; the cross head 4 of one or the other piston rod is caused to trip the arm 34 by engagement of the trip arm 50 therewith, said trip arm 50 being attached to the said cross head. This operation is repeated and the result is the ratchet wheel 36 and disk 37 are uniformly moved step by step, measuring a gallon at a time on the dial 38, until the pointer 44 is returned to its zero position, at which time said pointer engages the arm 47 on the upper end of shaft 28 and rocks said shaft sufficiently to remove the latch 25 from the position shown in Fig. 10; the lever 7 is then moved outward by the spring 55 to detach the clutch members.

I claim:

1. In a power pump for measuring oil, a cylinder, a piston and rod movable therein, a cross head on the upper end of said piston rod, a pitman connected to the cross head, a driving crank connected to the pitman, a dial and coöperating means to indicate the quantities of oil dispensed from the cylinder, and means controlled through the ascending movement of the cross head to cut off the power from the pump at the completion of each discharge of oil as per the indication on the dial.

2. In a power pump for dispensing oil, a cylinder, a piston and piston rod, a cross head to which the piston rod is connected, a crank, and a pitman connected with the crank and cross head, a computing dial to indicate each discharge of oil from the cylinder, and means interposed between said computing dial and said cross head whereby said cross head imparts movement to the dial to record thereon each discharge of oil from the cylinder.

3. In a power pump for dispensing oil, a cylinder, a piston and piston rod, a cross head a pitman and crank connection with said cross head, a clutch controlling the power admitted to the crank, a lever controlling the clutch, said lever being manually operated, means for locking said lever in position, a computing dial to indicate the quantities of oil discharged from the cylinder, means interposed between the cross head and the computing dial whereby said dial is actuated from the cross head to indicate each discharge of the cylinder, and means actuated by the computing dial to release the operating lever and whereby the clutch devices are thrown out of engagement and the pump is stopped at the completion of its operation, in discharging the quantity of oil indicated upon the dial.

4. In a power pump for dispensing oil, a cylinder, a piston and piston rod, a cross head to which the piston rod is connected, means for driving said cross head to actuate the piston, a computing dial upon which the quantity of oil to be dispensed is indicated in advance of the operations of the pump, and means interposed between said computing dial and the cross head whereby said computing dial is returned to zero position step by step from the cross head in each operation of the pump from the point indicated upon the dial when the dial is set.

5. In a power pump for dispensing oil, twin cylinders, a piston and piston rod for each cylinder, a cross head connected to the piston rod of each cylinder, a pitman and crank connection with each cross head, clutch devices controlling the power transmitted to said crank, a computing dial to indicate in advance of the operations of the pump, the amount of oil to be dispensed from both cylinders, means interposed between one of the cross heads and the dial mechanism whereby said dial is actuated from said cross head to indicate the quantity of oil discharged from both cylinders in each operation of said cylinders, and means actuated from the computing dial mechanism when said dial is returned to its zero position by the successive operations of the pump and whereby the power is automatically cut off from the pump when the dial is so moved to zero.

6. In a power pump for dispensing oil, a cylinder, a piston and piston rod, a cross head to which said piston rod is attached, a trip arm attached to said cross head, a computing dial, a pointer manually movable to a position to indicate the quantity of oil to be dispensed, a rotatable disk to which said pointer is locked when so moved, means for so locking said pointer, a ratchet wheel fixed to said disk, an arm supporting a pawl engaging said ratchet wheel, a trip arm connected with said pawl-supporting arm, said trip arm being adapted to be engaged by the trip arm on the cross head when the latter reaches the limit of its movement in the operations of the pump.

7. In a power pump for measuring oil, a cylinder, a piston and piston rod, a cross head on the upper end of said piston rod, a trip arm fixed to said cross head, a stationary plate attached above the cylinder, a consecutive counter mounted on said plate, a stationary dial indicator mounted on said plate, an apertured disk lying within said plate, a disk supporting a dial pointer, means for interlocking said dial pointer with said disk to indicate upon the dial the quantity of oil to be dispensed from the pump, a series of pins on said disk adapted to actuate the consecutive counter to register thereon the total quantity of oil dispensed, a ratchet wheel fixed to said disk, the teeth upon said ratchet wheel coinciding in number with the apertures in said disk, a ratchet pawl, and means adapted to drive said ratchet pawl to impart movement to the apertured disk and therewith the dial pointer, said pawl-driving means being adapted to be tripped by the trip arm on the cross head at the completion of each discharge of oil from the cylinder.

8. In a power pump for measuring oil, a cylinder, a piston and rod movable therein, a head on said piston rod, a pitman and driving crank connection with said head, a computing dial to indicate the quantity of oil to be dispensed from the pump, a pointer movable to a position to indicate on the dial the quantity of oil to be discharged in advance of the operations of the pump, a consecutive counter to record the quantity of oil discharged from the pump, a rotatable disk, means on said disk for actuating the consecutive counter, means for interlocking the dial pointer with said disk when said pointer is moved to its initial indicating position, and means interposed between said rotatable disk and the head of the piston rod whereby said disk is actuated upon each operation of the pump.

9. In a power pump for measuring oil, twin cylinders, a piston and piston rod for each cylinder, a cross head to which each piston rod is connected, a pitman and crank connection with each cross head, a clutch controlling the power transmitted to said cranks and pitman, an operating lever manually operative to engage said clutch devices to transmit the power to said cranks and pitman, locking devices holding said lever in the position in which the clutch devices are engaged, a computing dial, means interposed between one of the cross heads and said computing dial whereby the dial is intermittently rotated from a set position to its zero position and means interposed between the computing dial and the lever-locking devices whereby said devices are actuated to release said lever when the dial has been moved to zero, and the releasing of said lever separates the clutch devices to shut off the power from the pump.

In testimony whereof I affix my signature, in presence of two witnesses.

JOHN B. DAVIS.

Witnesses:
C. M. THEOBALD,
MATTHEW SIEBLER.